United States Patent [19]
Yoshimi et al.

[11] Patent Number: 5,908,590
[45] Date of Patent: Jun. 1, 1999

[54] PROCESS AND APPARATUS FOR MANUFACTURING A FOAMED RESIN CONTAINER WITH A LABEL

[75] Inventors: Toru Yoshimi; Hiroshi Hasegawa; Yasuhiro Ono, all of Ibaraki; Akio Tsujita, Osaka; Hirotomo Iwasaki; Masaru Chiba, both of Shiga, all of Japan

[73] Assignees: Sekisui Plastics Co., Ltd.; Nissin Food Products Co., Ltd., both of Osaka, Japan

[21] Appl. No.: 08/894,560

[22] PCT Filed: Dec. 27, 1996

[86] PCT No.: PCT/JP96/03851

§ 371 Date: Oct. 29, 1997

§ 102(e) Date: Oct. 29, 1997

[87] PCT Pub. No.: WO97/24212

PCT Pub. Date: Jul. 10, 1997

[30] Foreign Application Priority Data

Dec. 28, 1995 [JP] Japan .................................. 7-343788
Mar. 11, 1996 [JP] Japan .................................. 8-053425

[51] Int. Cl.$^6$ ............................ B29C 44/06; B29C 44/12
[52] U.S. Cl. ......................... 264/45.4; 264/153; 264/511; 425/4 R; 425/126.1; 425/297; 425/817 R
[58] Field of Search .................................. 264/45.4, 511, 264/153; 425/503, 504, 126.1, 297, 4 R, 817 R

[56] References Cited

U.S. PATENT DOCUMENTS 3,984,511 10/1976 Lammers ................................ 264/45.4
4,335,635 6/1982 Hautemont ............................ 425/126.1
4,787,833 11/1988 Krall ..................................... 425/126.1
4,840,366 6/1989 Johnston et al. ........................ 425/504
4,913,643 4/1990 Shinozawa et al. ..................... 425/503
5,032,344 7/1991 Kaminski .............................. 425/126.1
5,043,130 8/1991 Fujio ..................................... 425/504
5,198,247 3/1993 Bartimes et al. ........................ 425/504
5,223,315 6/1993 Katsura et al. ........................... 156/232
5,254,302 10/1993 Yamanaka ............................... 264/129
5,344,305 9/1994 McKillip ................................. 425/504
5,350,483 9/1994 Yager et al. ............................. 156/245
5,415,536 5/1995 Ohno ...................................... 264/511
5,753,278 5/1998 Aguilar ................................. 425/126.1

FOREIGN PATENT DOCUMENTS 4-331132 11/1992 Japan .
6-64058 3/1994 Japan .
2 197 242 5/1988 United Kingdom .................. 264/45.4
WO97/24212 7/1997 WIPO .

*Primary Examiner*—Allan R. Kuhns
*Attorney, Agent, or Firm*—Nikaido, Marmelstein, Murray & Oram LLP

[57] ABSTRACT

The present invention provides a process and apparatus for readily and continuously producing foamed resin containers with labels by following a process sequence including the steps of supplying a sheet which bears label bodies printed in predetermined positions thereon, positioning a label body, punching the label body, and molding a foamed resin container with the label properly positioned. The invention further provides a process which allows for precise positioning of a label. Therefore, a thin and less stiff synthetic resin sheet can be employed for the label instead of a paper base. In addition, the label can be applied in a predetermined position on the foamed resin container without preliminarily rolling the label into a predetermined tubular shape.

4 Claims, 13 Drawing Sheets

F I G. 12
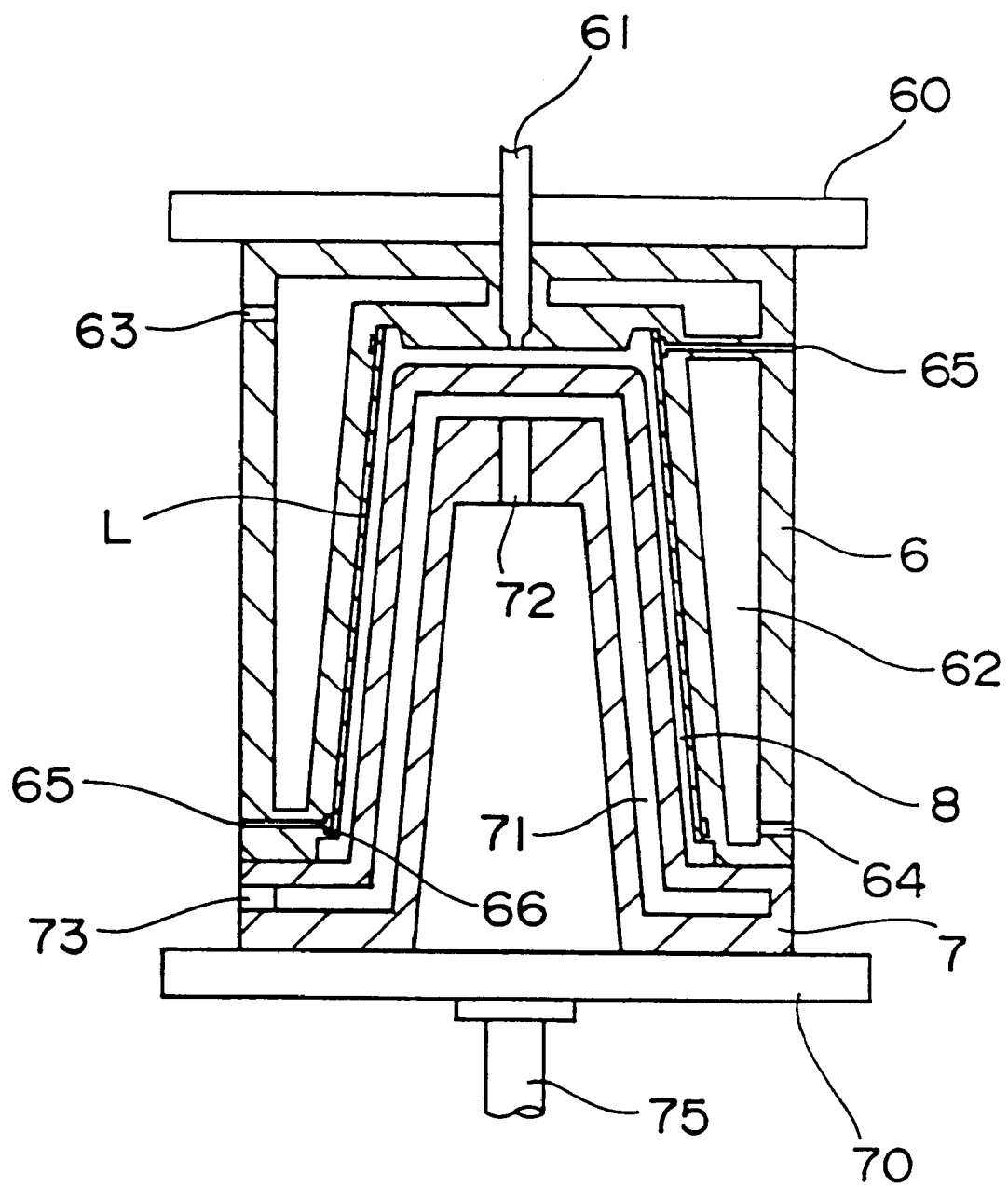

F I G. 13
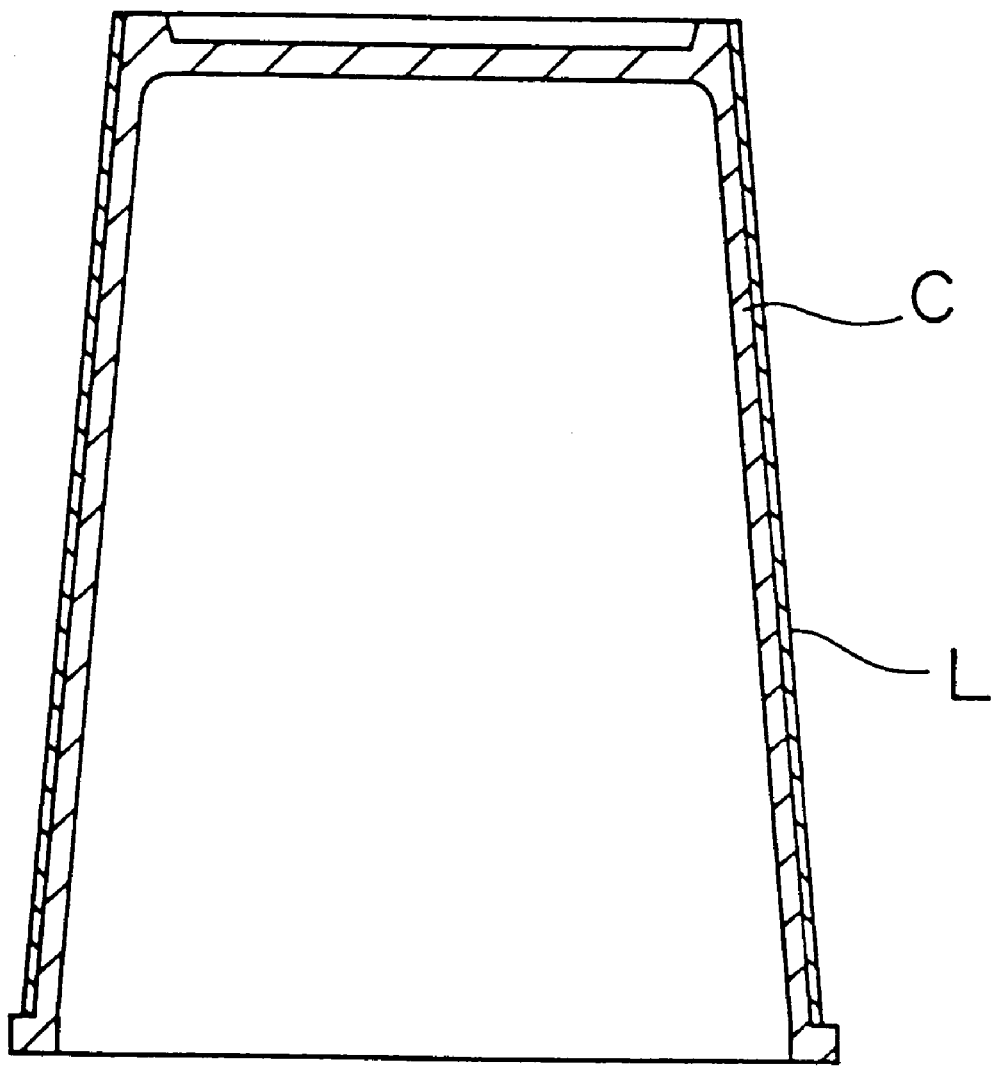

PROCESS AND APPARATUS FOR MANUFACTURING A FOAMED RESIN CONTAINER WITH A LABEL

TECHNICAL FIELD

The present invention relates to a process and apparatus for producing a foamed resin container with a label for use as a bowl for instant noodles, a drinking cup for juice, hot coffee or the like, a vessel for frozen sweets, or a like packaging container.

BACKGROUND ART

Conventionally, foamed resin containers have widely been used as vessels for instant food, juice or the like. Such a foamed resin container is generally produced through a foam molding method in which pre-foamed beads obtained by preliminarily foaming foamable resin beads containing a polystyrene resin and a volatile blowing agent such as butane, pentane or chrolofluorocarbon are loaded in a mold cavity and heated by a heating medium such as steam for foaming the foamed resin containers.

Some of the foamed resin containers are provided with a label which bears information such as a trade name and a maker's name and/or a design such as a vignette printed thereon, or serves to impart an excellent gas barrier property to the foamed resin containers.

Known as a method for providing such information or the like on the surface of a foamed resin container (foamed bead cup), there are a method wherein information or the like is directly printed on the surface of a foamed resin container, a method wherein a label bearing information or the like preliminarily printed thereon is bonded onto a foamed resin container, and a so-called shrink-labeling method wherein a heat-shrinkable film bearing information or the like preliminarily printed thereon is wrapped around a foamed resin container and shrunken by heat.

In the method of directly printing on the surface of a foamed resin container, it is difficult to obtain a sharp printing like gravure or to perform a multi-color printing. In the method of bonding onto a foamed resin container a label bearing information preliminarily printed thereon, a container molding step, a label stamping step, and a label bonding step are separately performed. Therefore, it is required that the label be positioned in place in the label bonding step, so that the process is complicated. In the shrink labeling method using a heat-shrinkable film, the heat-shrinkable film softly adheres on the container so that the film is liable to slip out of the container if the container has an inclined circumferential surface.

To solve these problems, Japanese Unexamined Patent Publication No. 4-331132 (1992) discloses a method for in-mold labeling of a foamed resin container, which includes steps of rolling into a predetermined tubular shape a print paper sheet having a print layer on the outer surface and a heat-seal layer on the inner surface of a paper base, setting the print sheet in a cavity mold, fixing the print sheet on the inner wall of the cavity mold by evacuating the cavity through a multiplicity of gas vent holes provided in the cavity mold, matching the cavity mold with a core mold, loading foamable resin beads into a gap defined between the print paper sheet and the core mold for foam molding, and fuse-bonding the print paper sheet onto the resulting foamed resin container by applying heat thereto for the foamed resin molding.

However, the aforesaid method involves complicated process steps because the print paper sheet is once punched out into a predetermined configuration and then the punched sheet should be rolled into a tubular shape. Further, the print paper sheet which has the print layer and the heat-seal layer provided, respectively on the opposite surfaces of the paper base is inferior in the moisture resistance and gas-barrier property. Therefore, the paper sheet absorbs steam applied when the foamed resin container is molded, so that the printing is liable to be blurred. In addition, because the print layer on the outer surface of the paper base is brought in directly contact with the cavity mold, the printing ink is liable to be transferred onto the cavity mold from the print paper sheet by heat. If the printing ink transfer occurs, the print density on the foamed resin container is reduced, resulting in a printing failure. The ink transferred onto the cavity mold is further transferred onto the next mold product, resulting in successive printing failures.

Since the print paper sheet should be rolled into a tubular shape before the molding, the process steps are complicated, resulting in an increased cost.

To solve these problems of the prior art, it is an object of the present invention to provide a novel process and apparatus for producing a labeled foamed resin container with which employ a thin and less stiff or floppy synthetic resin sheet instead of the paper base and a label obtained by preliminarily printing fine letters and a sharp design such as including smooth gradation on the resin sheet, and is adapted to apply the floppy sheet label in a predetermined position on the foamed resin container by integral molding without rolling the label into a tubular shape before molding the foamed resin container.

It is a more specific object of the present invention to provide a process and apparatus for producing a foamed resin container with a label, in which a sheet which bears printed labels in predetermined portions thereof is continuously supplied and a process sequence from the step of punching a label from the sheet to the step of molding the foamed resin container with a label is readily and continuously performed.

DISCLOSURE OF INVENTION

In accordance with one preferred mode of the present invention to achieve the aforesaid objects, there is provided a process for producing a foamed resin container with a label provided on a circumferential surface thereof by integral molding, comprising steps of:

supplying a continuous sheet which bears label bodies printed thereon to a label punching device upon positioning each of the label bodies at a punching position;

cutting off the label body and fixing a resulting label on a label reception platform having means for fixing the label beneath the punching position;

moving the label reception platform which bears the label fixed thereon to supply the label to a predetermined position with respect to a dummy core mold;

applying pressurized gas jet to the label to wind the label around the dummy core mold while fixing the label around the dummy core mold by suction through vent holes formed in the dummy core mold;

matching the dummy core mold which bears the label fixed thereon with a cavity mold, and then transferring and fixing the label onto an inner wall of the cavity mold in intimate contact therewith by stopping the suction from the dummy core mold or by pressurizing through the vent holes of the dummy core mold while sucking through vent holes formed in the cavity mold;

separating the dummy core mold from the cavity mold which bears the label fixed on the cavity inner wall in intimate contact therewith; and locking a core mold with the cavity mold, loading foamable resin beads therebetween, and heating the foamable resin beads for foam molding, whereby the foamed resin container is molded integrally with the label.

In accordance with another preferred mode of the present invention, there is provided an apparatus for producing a foamed resin container with a label provided on a circumferential surface thereof by automatically performing a process sequence from a label punching step to an integral molding step, comprising:

a sheet feeding device having a mechanism which is capable of positioning each of label bodies printed on a continuous sheet;

a label punching device which includes a punching mechanism for punching the supplied sheet in order to obtain a label in a predetermined configuration, and a label reception platform adapted to fix the label thereon at a position where the label has been punched and to be movable to a predetermined position with respect to a dummy core mold;

a device for winding up the sheet after the punching of the label;

a cavity mold provided in association with the dummy core mold so that the cavity mold can be matched with the dummy core mold, the dummy core mold having vent holes for suction to fix the label around the dummy core mold after the label is wound around the dummy core mold by a pressurized gas jet mechanism; and a core mold provided in association with the cavity mold so that the cavity mold can be matched with the core, the core mold having suction holes for intimately fixing the label thereon by sucking the label after the label is transferred from the dummy core mold onto an inner wall of the cavity mold, a feed hole for feeding foamable resin beads, and heater means for foam molding, the cavity mold having heater means for the foam molding.

In accordance with the present invention, a continuous sheet which bears label bodies printed in predetermined portions thereof is supplied so that each of the label bodies can be properly positioned, and then the label body is cut off and transported to the predetermined position with respect to the dummy core mold by the label reception platform which has the means for fixing the label to that position. Therefore, only one positioning operation is required before the label punching, and no subsequent positioning operation is required. Further, since the label such as of a synthetic resin wound around the dummy core mold is held around the dummy core mold by suction through the vent holes, there is no need to preliminarily roll the label into a tubular shape.

Therefore, the foamed resin container with a label provided in a predetermined position on the circumferential surface of the container in an integral manner can be produced readily and efficiently. Further, the step of rolling the label into a tubular shape can be eliminated, so that the apparatus can be simplified, requiring no complicated process and no special device.

In the production apparatus, the label punching mechanism includes a punching plate for cutting off the label from the sheet which bears the label bodies printed thereon and then holding the label, the punching plate being formed with an opening having a configuration compatible with the label, and the label reception platform is adapted to move up through the opening to the upper side of the punching plate and have vent holes for pressurization and suction.

With this arrangement, the label thus cut off and held on the punching plate is transported, as it is, to the dummy core mold and therefore, the position of the label once determined is not changed.

In accordance with another preferred mode of the present invention, there is provided a process for producing a foamed resin container with a synthetic resin label provided on a circumferential surface thereof by integral molding, comprising steps of:

winding the label around a dummy core mold, and retaining the label around the dummy core mold by suction through vent holes formed in the dummy core mold;

correcting a possible positional offset of the label by stopping the suction from the dummy core mold immediately before the dummy core mold retaining the label is matched with a cavity mold, or by matching the dummy core mold with the cavity mold;

transferring the label onto a cavity inner wall of the cavity mold and fixing the label thereto in intimate contact therewith by pressurizing the label through the vent holes of the dummy core mold;

separating the dummy core mold from the cavity mold with the label fixed onto the cavity inner wall in intimate contact therewith; and locking the cavity mold with a core mold with the label fixed onto the cavity inner wall in intimate contact therewith, then loading foamable resin beads, and heating the foamable resin beads for foam molding, whereby the foamed resin container is molded integrally with the label.

In accordance with the present invention, the suction from the dummy core mold is stopped immediately before the dummy core mold holding the label thereon is matched with the cavity mold to correct the positional offset of the label by the matching of the dummy core mold with the cavity mold. Even if the positional offset of the label occurs, the label wound around the dummy core mold is once freed and therefore, when the dummy core mold is matched with the cavity mold, the positional offset of the label is corrected. Then, the label is transferred onto a predetermined position of the inner wall of the cavity mold and fixed thereon in intimate contact therewith by pressurizing the label through the vent holes of the dummy core mold in the subsequent step.

Thereafter, the cavity mold is locked with the core mold with the label fixed onto the cavity inner wall in intimate contact therewith. Then, the foamable resin beads are loaded and heated for foam molding, whereby the foamed resin container can be molded integrally with the Label. Therefore, the foam molding of the foamed resin container and the application of the label are simultaneously achieved while the positional offset of the label is efficiently prevented without rolling the label into a tubular shape before the foam molding.

Thus, the foamed resin container with the synthetic resin label provided on the circumferential surface thereof can be produced efficiently through a simplified process by employing a thin and less stiff synthetic resin sheet, instead of a paper base, and a label bearing fine letters and a sharp design such as including smooth gradation preliminarily printed thereon and by providing the label in a predetermined position on the foamed resin container in an integral manner while efficiently preventing the positional offset of the label.

The resulting foamed resin container with a label is aesthetic, and the label is flush with the circumferential surface of the resulting foamed resin container, and is less liable to be peeled off. Therefore, the foamed resin container can readily be produced which has a label bearing information represented by fine letters and a sharp design such as including smooth gradation printed thereon by multicolor printing or the like.

BRIEF DESCRIPTION OF THE DRAWINGS

FIG. 12 is a sectional view illustrating a core mold and a cavity mold matched with each other; and FIG. 13 is a vertical sectional view illustrating a foamed resin container with a label.

BEST MODE FOR CARRYING OUT THE INVENTION

Figure 1:
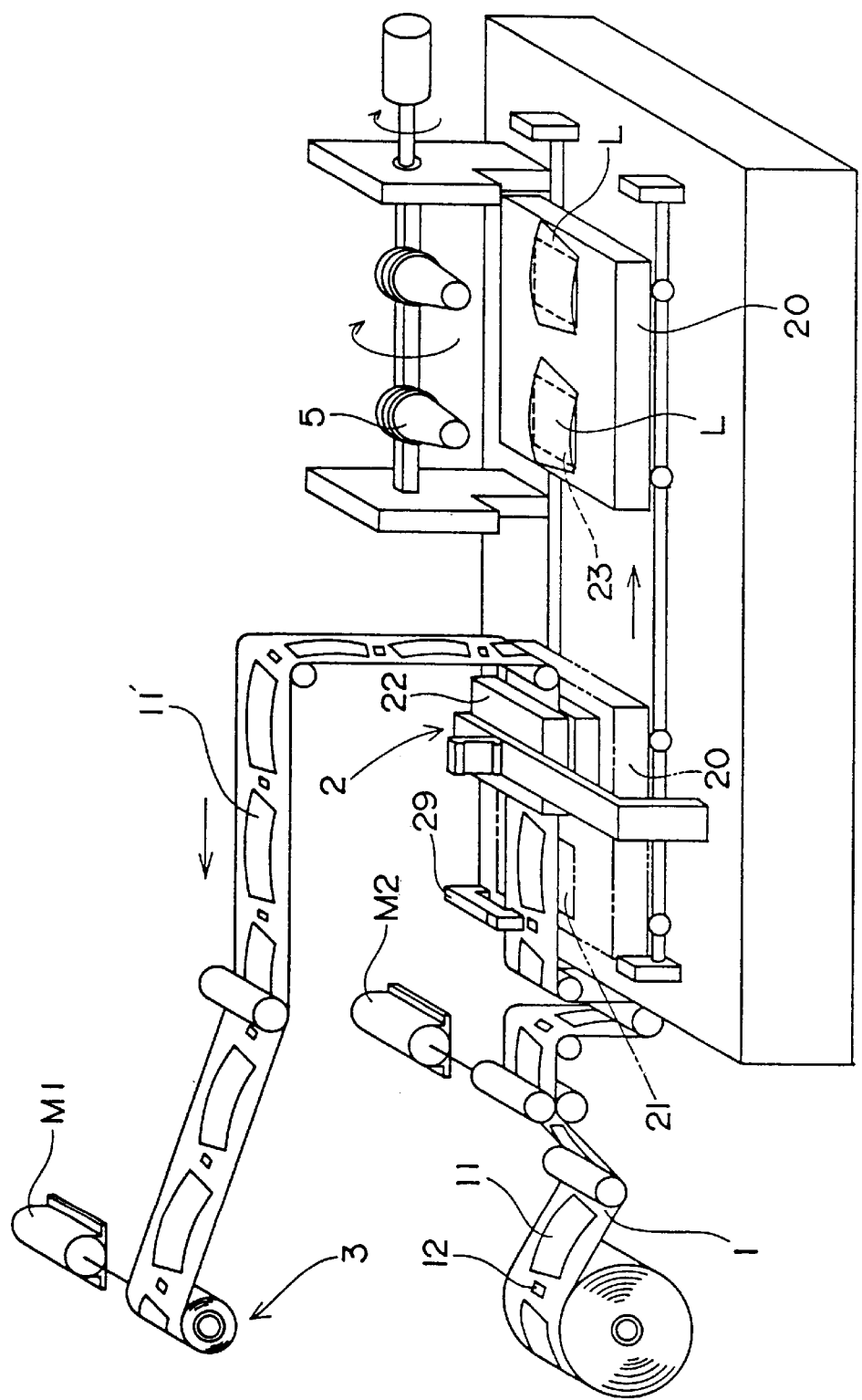
FIG. 1 is a schematic view illustrating an apparatus adapted to supply a sheet including label bodies printed in predetermined positions thereon, stamp out a label body out of the sheet and transport the resulting label in accordance with one embodiment of the present invention.
Figure 2:
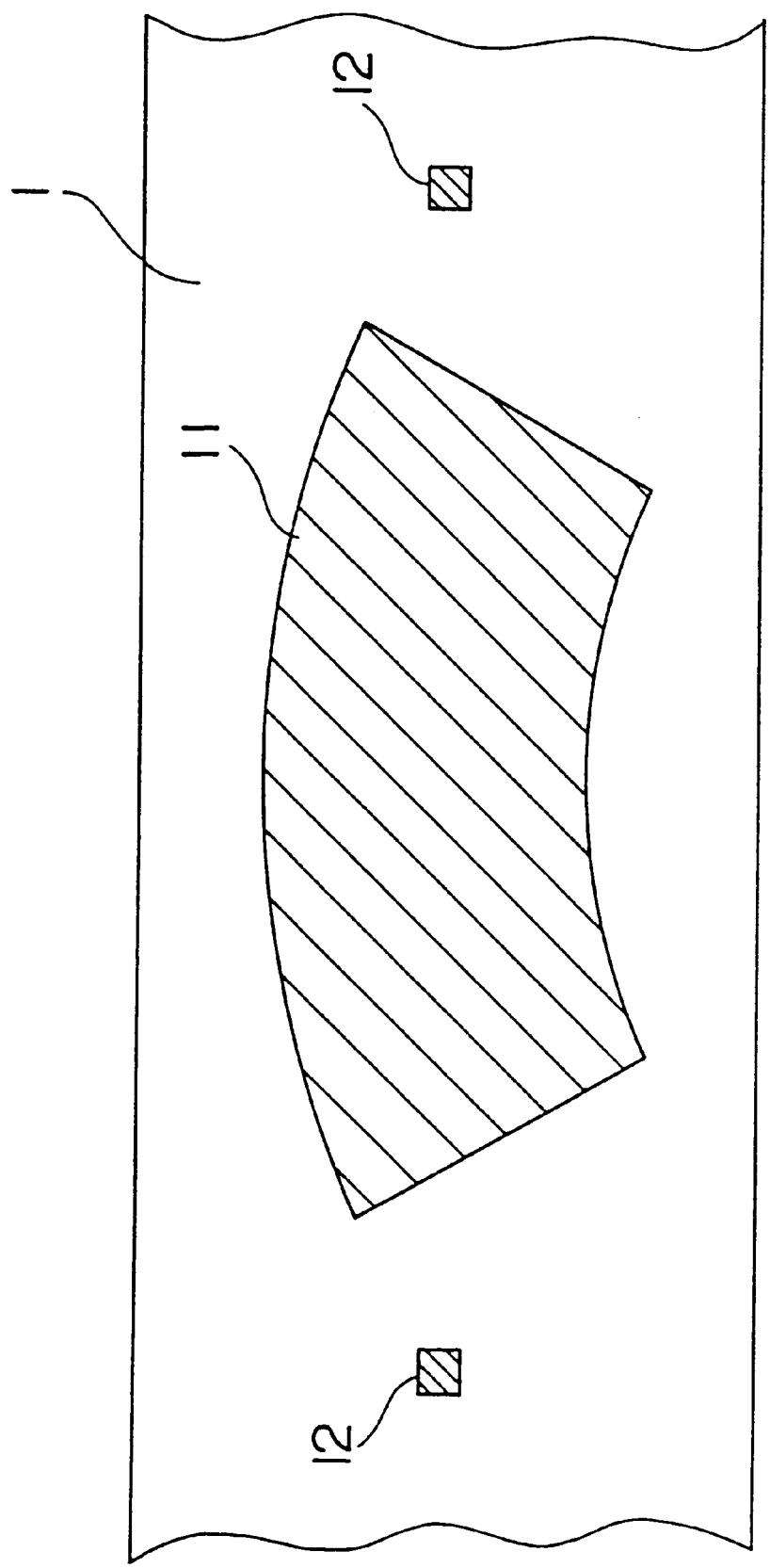
FIG. 2 is a front view illustrating a sheet which bears a label body in a predetermined position thereof.

Preferred embodiments of the present invention will hereinafter be described. In the present invention, as shown in FIG. 1, to obtain a label L a continuous sheet 1 on which label bodies 11 each bearing information represented by letters and vignettes designs or the like are printed are punched to cut off each label body 11. Reference numeral 11' denotes openings. The label bodies 11 printed on the sheet 1 are arranged at predetermined intervals, and each have a fan shape, for example, as shown in FIG. 2. Further, a position detection mark 12 is printed between each adjacent pair of label bodies 11, 11 on the sheet. The position detection mark 12 is detected by detector means 29 such as a photoelectric tube. The sheet 1 is quantitatively fed with the label body properly positioned by actuating a sheet feed driving motor M1 provided in association with the detector means.

Examples of specific sheets (films) on which the label bodies 11 are to be printed include resin films of thermoplastic resins, such as polystyrene, polypropylene, high density polyethylene, polyvinyl chloride, polyethylene terephthalate, polyamide and polyvinylidene chloride, containing 8% to 65% by weight of inorganic fine powder, films obtained by coating these resin films with a latex containing an inorganic filler, and films obtained by depositing aluminum on these films by evaporation. The base of the sheet may be either mono-layered or multi-layered.

As required, an adhesive layer is provided on the rear surface of the sheet (to be brought in contact with a foamed resin container). Exemplary materials for the adhesive layer include low density polyethylene, a copolymer of vinyl acetate and ethylene, a copolymer of ethylene and acrylate or methacrylate, and metal salts of a copolymer of ethylene and acrylate or methacrylate, among which a heat-sealable resin having a melting point of 85° C. to 135° C. is preferably used.

If the sheet which bears the label bodies 11 printed thereon is formed of a resin of the same type as the material for the foamed resin container or if a printing ink to be used is excellent in adhesiveness, the label may be fuse-bonded onto the foamed resin container in the molding. Where it is difficult to fuse-bond the label to the foamed resin container, however, the label L may have an adhesive layer for fuse-bonding on its rear surface to assuredly bond the label onto the foamed resin container. The adhesive layer may be provided either entirely or partially on the rear surface of the label L. The label L may have a thickness of 10 μm to 1 mm, preferably 50 μm to 100 μm.

Figure 3:
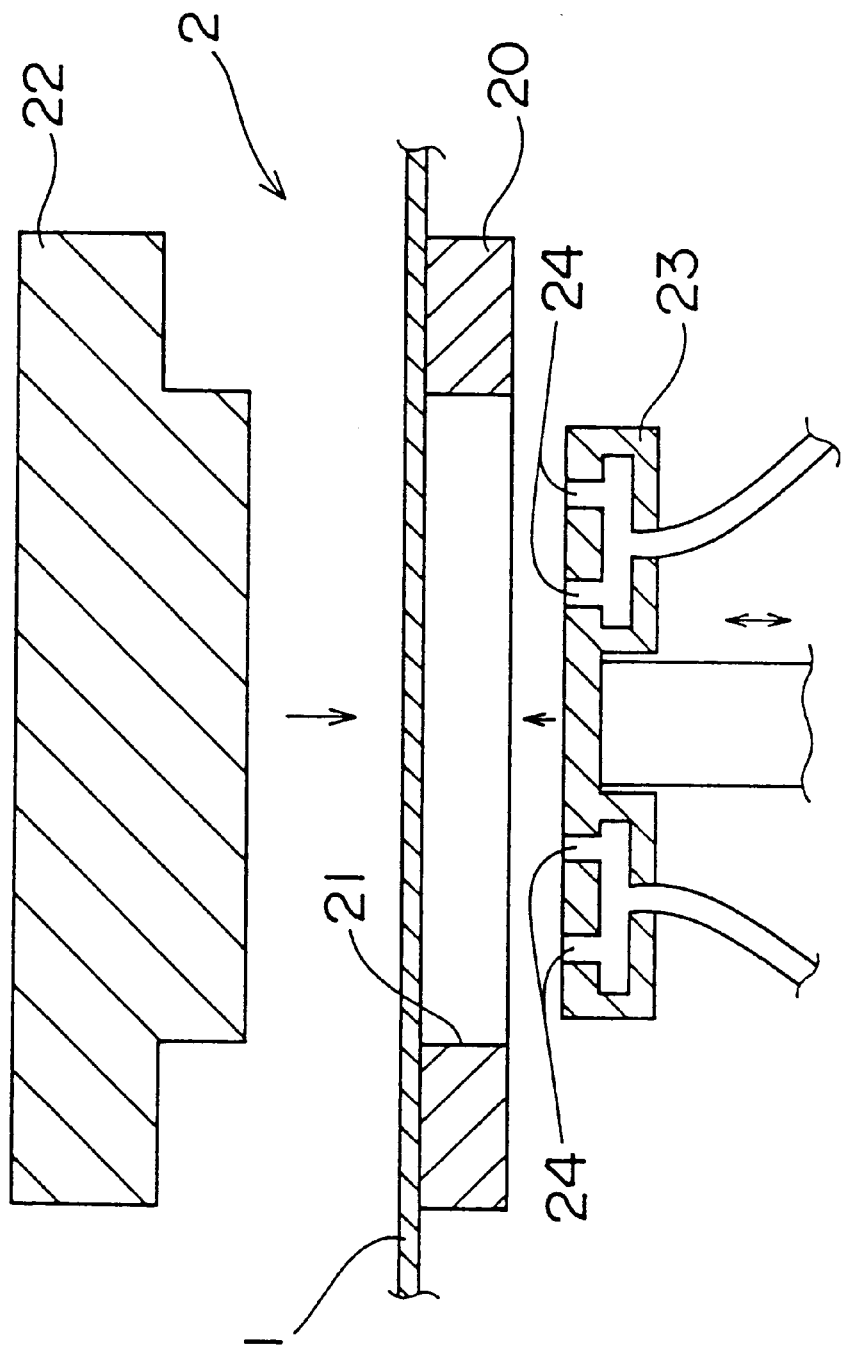
FIG. 3 is a sectional view illustrating a punching device.

The sheet 1 is fed in such a manner that one label body 11 can be positioned in a predetermined position, and then the fan-shaped label body 11 is cut off from the sheet. The label obtained by the punching is denoted at "L" in the drawings. A punching device 2 as shown in FIGS. 1 and 3 is used for the punching. For punching the sheet 1 to cut off the label body 11, after the feeding of the sheet 1, a press-punching drive portion 22 is driven against a punching plate 20 formed therein an opening 21 having a configuration compatible with the label body 11, thereby to press-cut the sheet. The punching plate 20 further includes a label reception platform 23 having, for example, vent holes 24 which can suck one or more labels, as means for fixing the label L to that position.

The label L is fixed onto the label reception platform 23 beneath the punching position by suction through the vent holes 24. After the label L is cut off, the sheet 1 is wound up by a sheet wind-up device 3 driven by a sheet wind-up driving motor M2. The wind-up device 3 is preferably operated in association with the aforesaid label body detection means.

The label reception platform 23 is movable together with the punching plate 20 between a position where the label punching device 2 is provided and a position where the label L is wound around a dummy core mold 5. Position detection means for properly determining the position of the label reception platform 23 are provided at the label punching position and at the position where the label L is wound around the dummy core mold 5.

Figure 4:
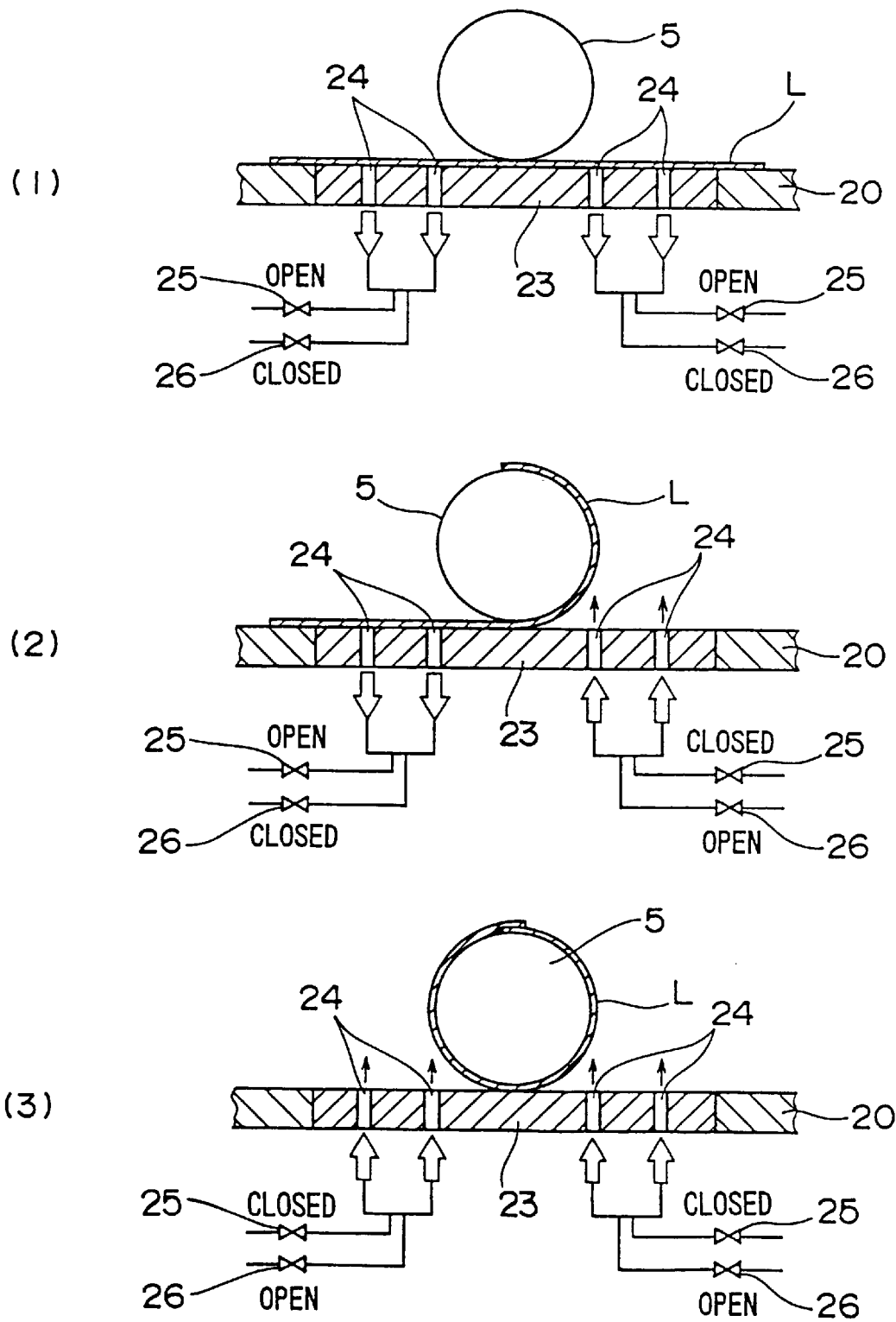
FIGS. 4(1) to 4(3) are diagrams for explaining the step of winding a label around a dummy core mold.

As shown in FIG. 4, the punching plate 20 which bears the label L fixed thereon by suction is moved to a predetermined position, and the label reception platform 23 is lifted up and set at the position where the label L is wound around the dummy core mold 5. The label reception platform 23 is positioned with respect to the dummy core mold 5 by various detection means.

Although the apparatus shown in FIG. 1 is constructed such that, after one label L is cut off, the label reception platform 23 is moved every by one label pitch to the next adjacent label L along with the punching plate 20 for the next label punching, the press-punching drive portion 22 may be moved instead by one label pitch. Alternatively, the press-punching drive portion 22 may be constructed such that two labels L can be cut off at a time, or such that more than two labels L can be cut off at a time. In such a case, a plurality of dummy core molds 5 are provided so that a plurality of foamed resin containers with labels can be produced by multi-shot molding. An embodiment for four-shot molding is shown as the multi-shot molding in FIG. 5.

The resulting label L is wound around the dummy core mold 5 by applying pressurized gas jet to the label L as shown in FIGS. 4(1) to 4(3). The application of the pressurized gas jet for winding the label L around the dummy core mold 5 is achieved by setting the label L with the central portion thereof abutting against the dummy core mold 5 as shown in FIG. 4(1), and closing pressure reduction valves 25 connected to the vent holes 24 of the label reception platform 23 and, at the same time, opening pressurization valves 26 to apply the pressurized gas jet to the label L. The right and left sides of the label L may be wound around the dummy core mold 5 in a time-staggered manner by applying pressurized gas jet alternately to the right side and the left side of the label L, as shown in FIGS. 4(2) and 4(3), by separately operating the pressure reduction valves 25 and the pressurization valves 26 connected to the left and right side vent holes. Thus, the edge portions of the label L can smoothly be overlapped, thereby suppressing the wrinkling and folding of the label L. Therefore, this arrangement is the most preferable.

Since the label L can be transported by moving the label reception platform 23 to the position where the label L is wound around the dummy core mold 5 after the label body 11 is once positioned for the punching, no subsequent positioning operation is required. In addition, there is no need to roll the label L into a tubular shape.

As described above, the pressurized gas jet may be equipped with the label reception platform 23. Alternatively, a label winding stand may separately be provided which has a pressurized gas jetting mechanism for winding the label L around the dummy core mold 5, and an additional step may be employed in which the label is transferred from the label reception platform 23 to the label winding stand through transfer means by suction. The employment of the label winding stand is particularly preferred where a plurality of foamed resin containers with labels are to be produced at a time. This arrangement is employed, for example, where the label bodies 11 are printed along a plurality of lines on the film sheet, or where a plurality of film sheets each bearing label bodies 11 are fed in parallel.

Figure 5:
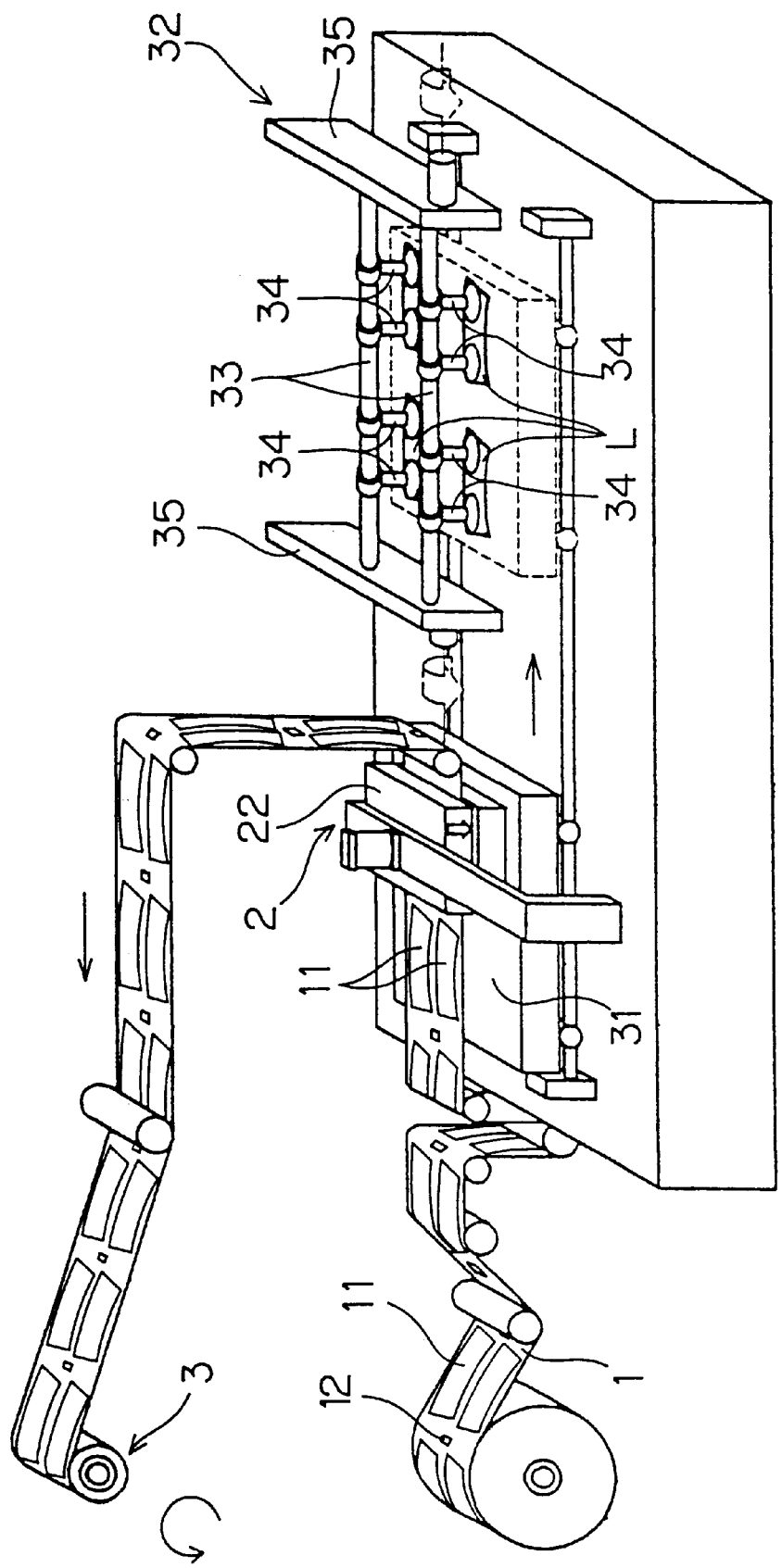
FIG. 5 is a perspective view illustrating a label winding device in accordance with another embodiment of the present invention.
Figure 6:
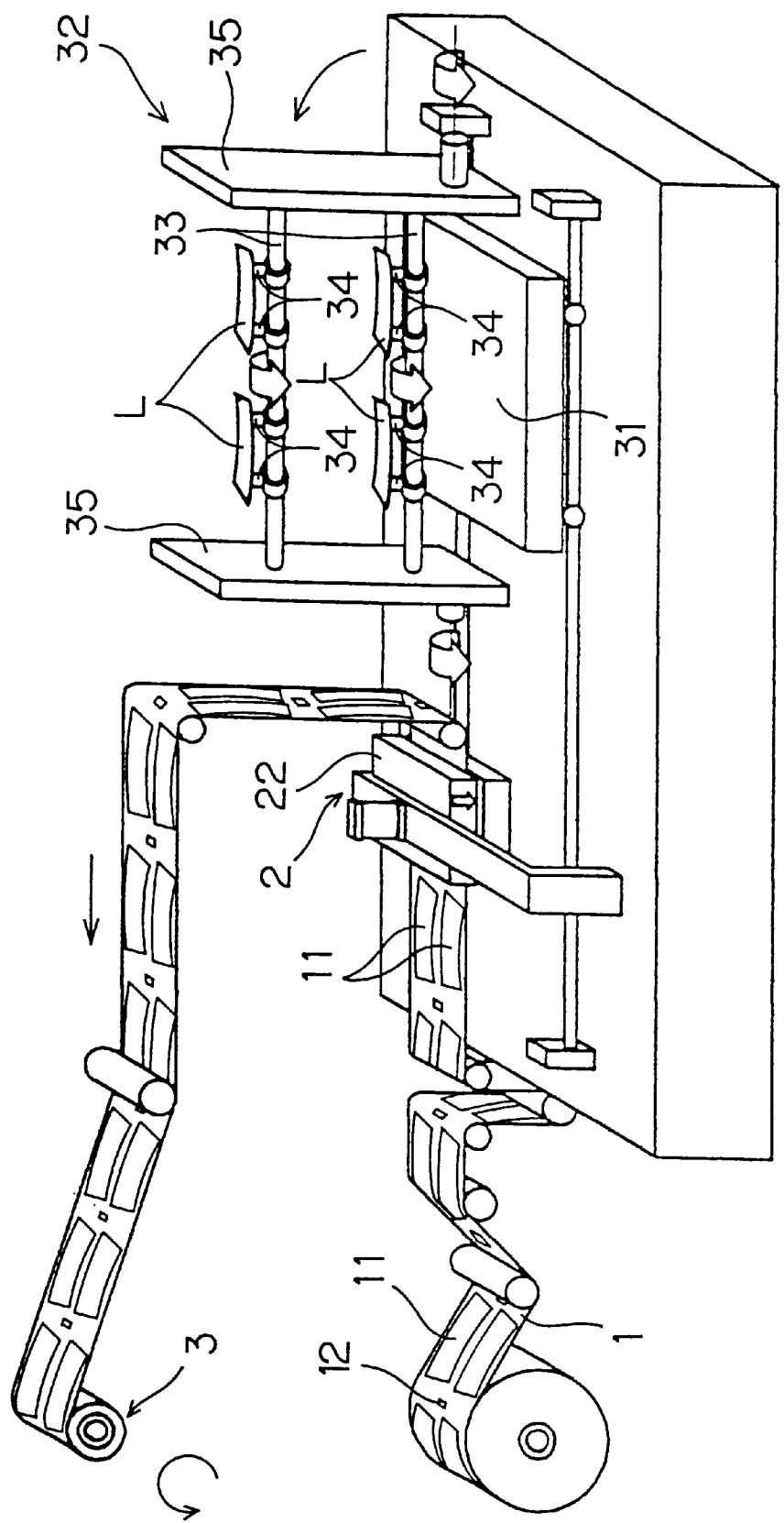
FIG. 6 is an explanatory diagram illustrating the operation of the label winding device of FIG. 5.
Figure 7:
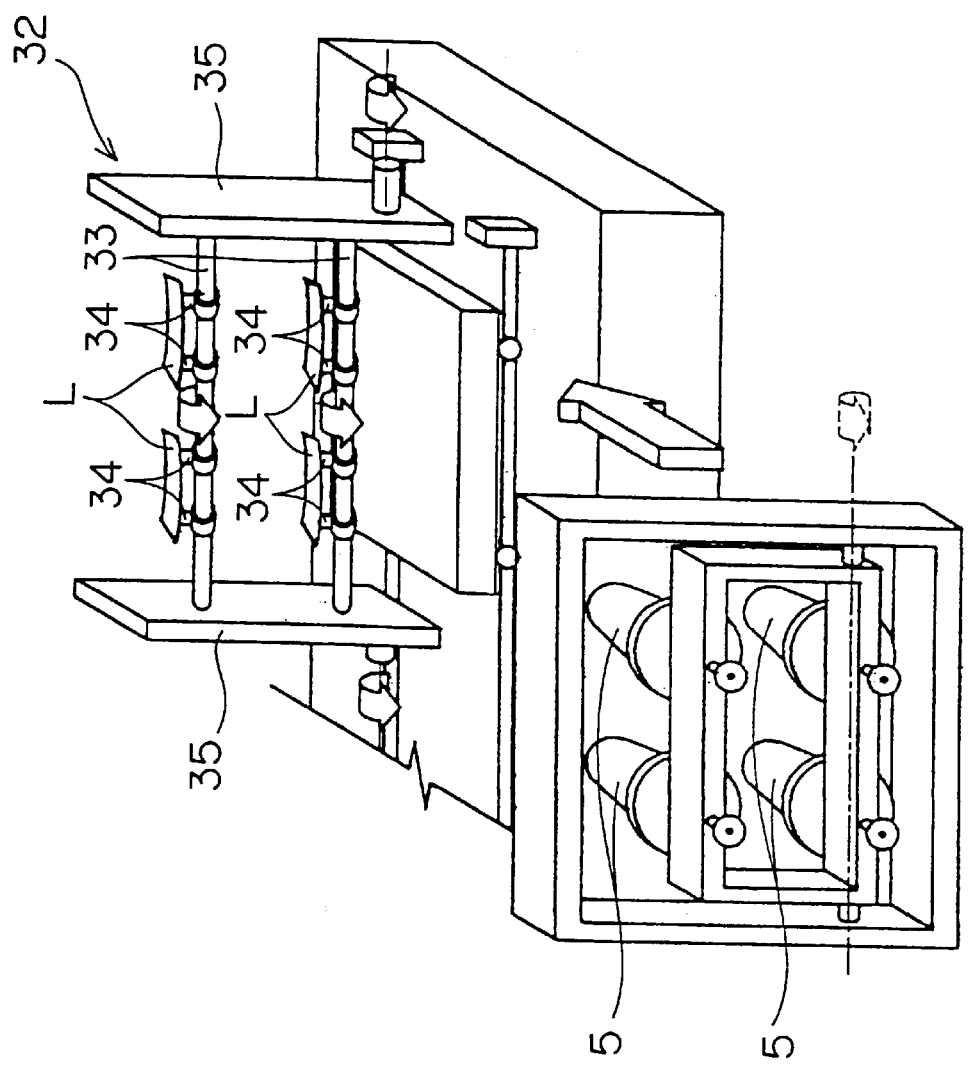
FIG. 7 is an explanatory diagram illustrating the positional relationship between the label winding device of FIG. 5 and dummy core molds.

FIGS. 5 to 7 show an apparatus which is capable of simultaneously forming four labels L and includes a label winding stand having a pressurized gas jetting mechanism, in accordance with another embodiment of the present invention.

The apparatus includes a punching plate 31 formed with recesses each having a configuration compatible with a label body, and a label winding stand 32 for sucking up labels L cut off on the punching plate 31 and winding the labels L around respective dummy core molds 5.

The punching plate 31 holds thereon the labels cut off by the driving of the press-punching drive portion 22. In this embodiment, a sheet which bears labels arranged along two parallel lines is fed. The punching plate 31 is moved by one label pitch with two labels held thereon, and the next two labels are cut off on the punching plate 31. Then, the punching plate 31 is moved to the lower side of the label winding stand 32 with the four labels L in total held thereon.

The label winding stand 32 includes two support pipes disposed parallel to each other and serve for conduits for suction and pressurization, and four sucking portions 34 provided on the support pipes 33 and each including a pair of air pipes. The sucking portions 34 are each connected to a pressure reduction valve and a pressurization valve as in the aforesaid embodiment.

When the labels L are transported or sucked, the two support pipes 33 are horizontally parallel with each other. When the labels L are fed to the dummy core molds 5, a support portion 35 is rotated by 90 degrees so that the support pipes 33 are vertically arranged as shown in FIGS. 6 and 7.

When the labels are to be wound around the dummy core molds 5, the dummy core molds 5 are moved to the upper sides of the respective labels L held by the label winding stand 32. The labels L are wound around the dummy core molds 5 by application of pressurized gas jet in the same manner as in the aforesaid embodiment.

In another embodiment for winding the labels around the dummy core molds 5, the support portion 35 may be moved along with the sucking portions 34 holding the labels without moving the dummy core molds 5.

Figure 8:
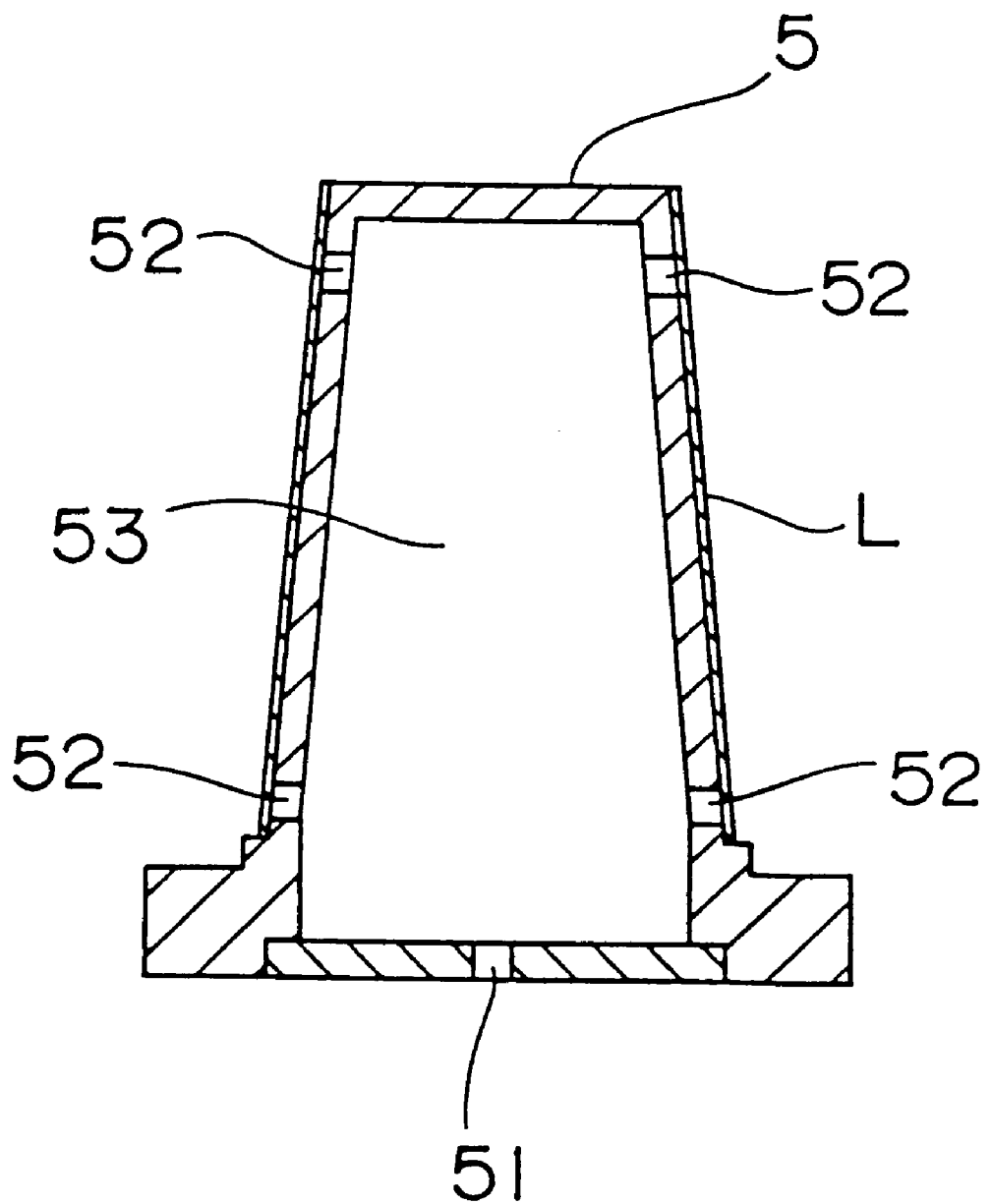
FIG. 8 is a sectional view illustrating a state where labels are wound around the dummy core molds.
Figure 9:
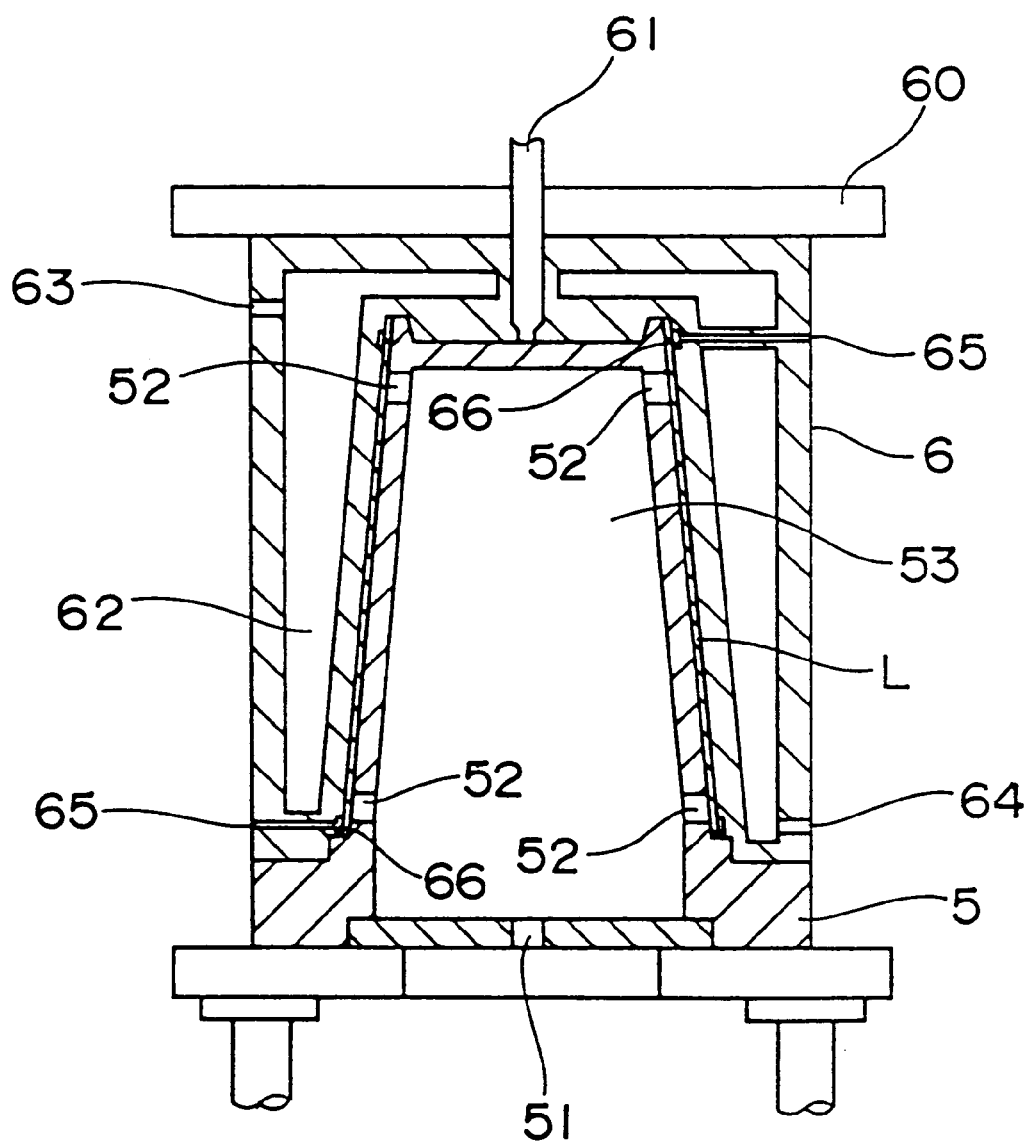
FIG. 9 is a sectional view illustrating a dummy core mold and a cavity mold matched with each other.

As described above, the labels L retained by the label reception platform 23 or the label winding stand 32 are wound around the dummy core molds 5 by applying pressurized gas jet to the labels L. The dummy core molds 5 each have a plurality of vent holes 52 formed in a circumferential wall thereof so that the wound labels L can be sucked and brought in intimate contact with the dummy core molds by vacuum. The vent holes 52 may be elongate slits or circular openings, for example. The dummy core molds 5 are slightly larger than core molds 7 (which will be described later) so as to be intimately matched with cavity molds 6 substantially without gap with the labels L fixed around the dummy core molds 5. As shown in FIGS. 8 and 9, the dummy core molds 5 each have an air chamber 53 provided therein, and a plurality of passages 51 formed in the bottom thereof for evacuating (vacuuming) or pressurizing the air chamber 53. The passages 51 are each provided with a pressure reduction valve 54 or a pressurization valve 55 (see FIG. 11) and connected to a pressure equipment not shown. Thus, when the pressure reduction valves 54 of the dummy core molds are opened, the air chambers 53 of the dummy core molds 5 are evacuated through the passages 51, thereby sucking the labels L through the passages 51. When the pressurization valves 55 are opened, the air chambers 53 in the dummy core molds 5 are pressurized through the passages 51. The aforesaid vent holes 52 communicate with the air chamber 53, and an atmospheric release valve 56 is provided which serves to instantaneously bring the evacuated or pressurized air chamber 53 back to the atmospheric pressure.

With the labels L thus wound around the dummy core molds 5, the pressure inside the air chambers 53 is reduced to, for example, 200 mmHg to 740 mmHg, whereby the labels L can be fixed on the circumferential surfaces of the dummy core molds 5. The pressure inside the air chambers 53 may properly be controlled depending on the thickness (or weight) of the label L.

After the labels have been suck-fixed on the dummy core molds 5, an assembly including the dummy core molds 5 is inverted or moved in such a manner that the dummy core molds 5 are brought closer to the cavity molds 6 (hereinafter referred to as "cavity molds") or, alternatively, the cavity molds 6 may be brought closer to the dummy core molds 5 so that the dummy core molds 5 can be matched with the cavity molds 6. In the subsequent step, the dummy core molds 5 are inserted into the cavity molds 6 to be matched therewith as shown in FIG. 9. Thereafter, suction (for pressure reduction) through vent holes 65 of the cavity molds 6 is started and, at the same time, pressurization through the passages 5L of the dummy core molds 5 is started or the suction through the passages 51 of the dummy core molds 5 is stopped, whereby the labels L are released from the dummy core molds 5 and fixed on cavity inner walls of the cavity molds 6 in intimate contact therewith.

Figure 10:
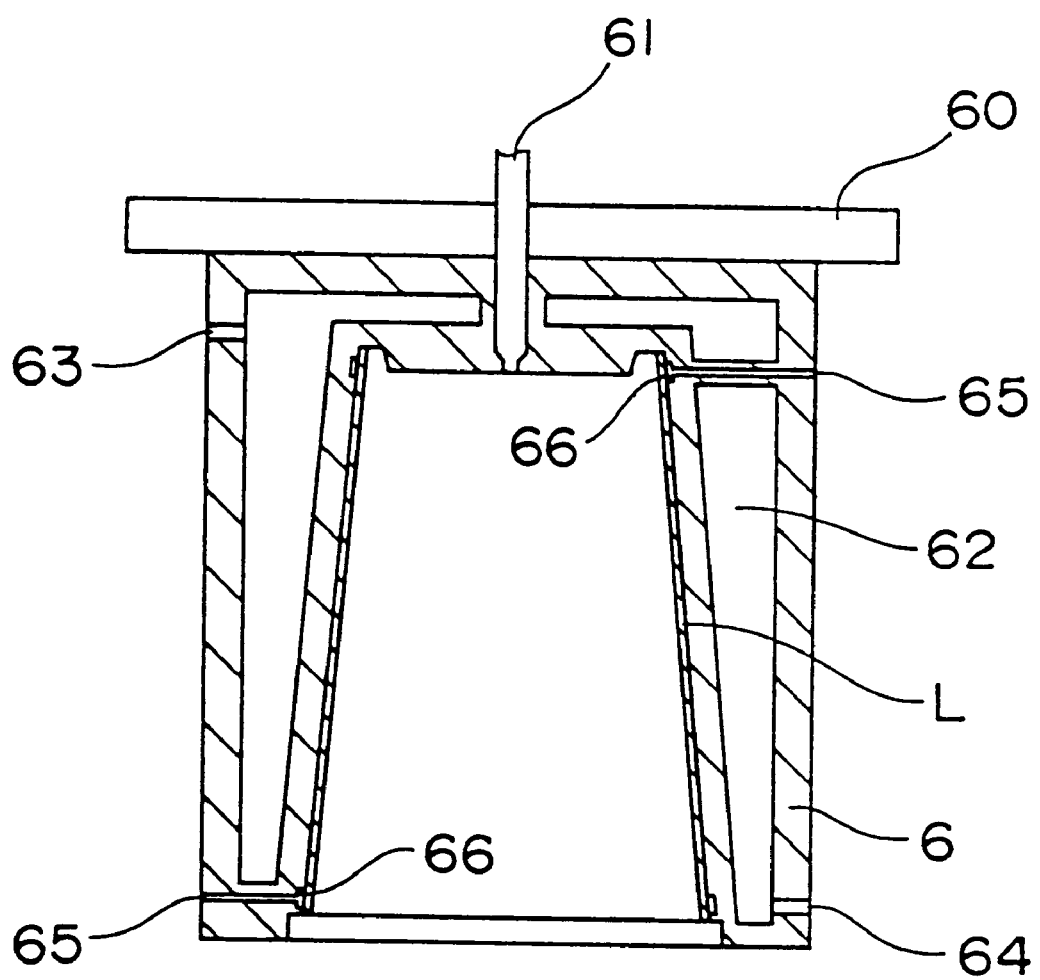
FIG. 10 is a sectional view illustrating a state after a label is transferred onto an inner wall of the cavity mold.

Referring FIG. 10, the cavity molds 6 each include annular grooves 66 formed in the cavity inner wall to be respectively fitted along upper and lower edges of the label L transferred and fixed onto the cavity inner wall, longitudinal grooves (not shown) formed in the cavity inner wall to be respectively fitted along left and right edges of the label L, and vent holes 65 for evacuating gaps defined between the label L fitted on the cavity inner wall and the annular grooves 66 and gaps defined between the label L and the longitudinal grooves. The cavity mold 6 has a steam chamber 62 therein so that the cavity mold 6 can indirectly be heated by introducing steam into the steam chamber 62. The cavity mold 6 further includes a loading device (not shown) for loading a material into a cavity 8 through a material supplying port 61, a steam and cooling water feeding port 63, a drain 64, an air supplying port (not shown) for supplying air to transfer a mold product onto a core mold 7.

The annular grooves 66 are respectively formed as corresponding to lines spaced 0.1 mm to 2 mm, preferably 0.2 mm to 0.5 mm, apart from the upper (or lower) edge of the label L, and each have a width of 0.1 mm to 1 mm and depth of 0.1 mm to 1 mm. The longitudinal grooves are respectively formed as corresponding to lines spaced 0 mm to 3 mm, apart from the left and right edges of the label L, and each have a width of 0.1 to 1 mm and a depth of 0.1 mm to 1 mm.

Where the label L is to be provided to entirely cover the circumferential surface of the foamed resin container, the left and right edges of the label L are preferably overlapped to a certain degree with the label fixed on the cavity inner wall in intimate contact therewith. However, provision of a greater overlap margin increases the wastage of the label L and is hence uneconomical. Accordingly, the overlap margin is preferably 0 mm to 10 mm.

Figure 11:
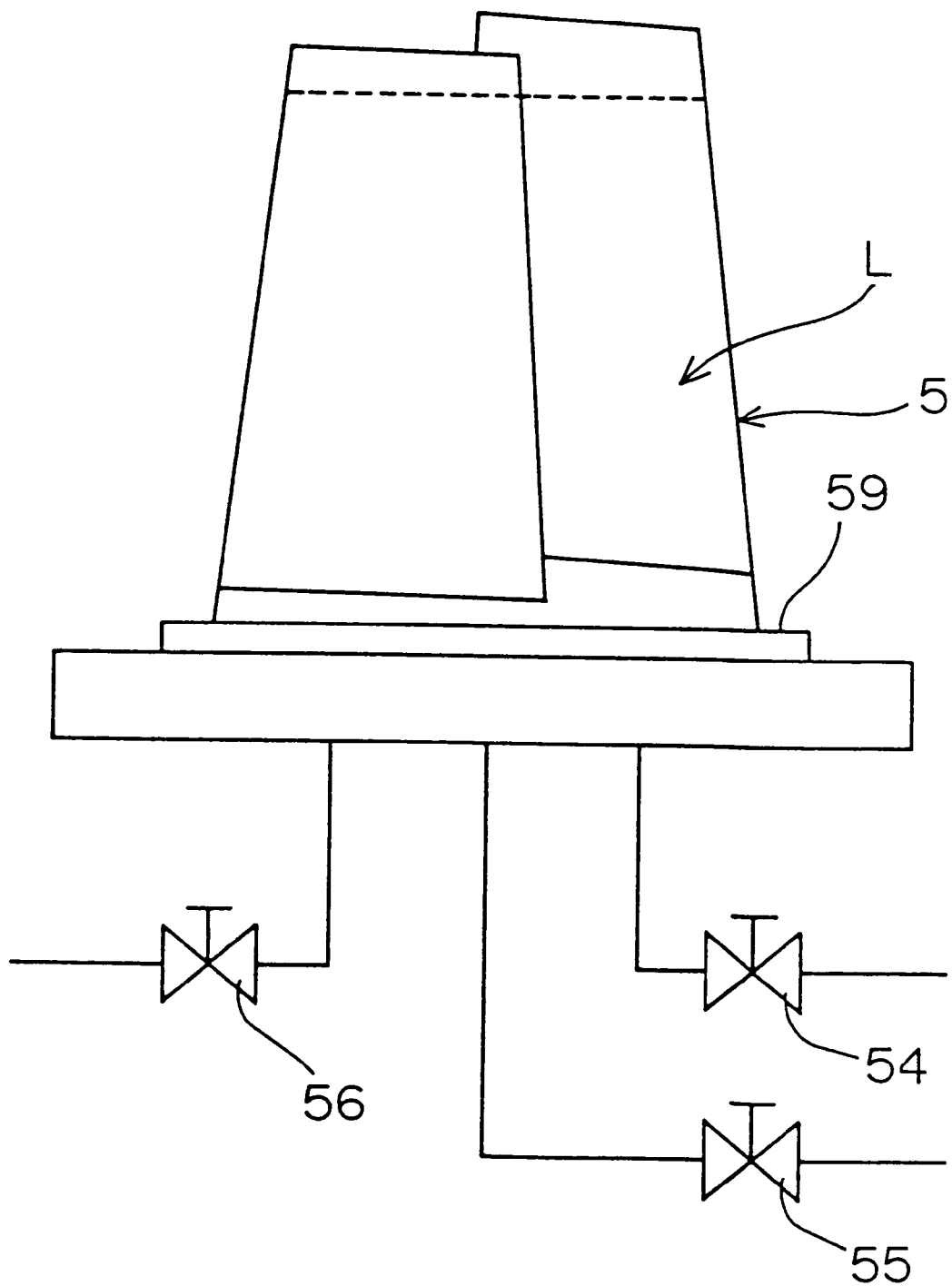
FIG. 11 is a reference diagram illustrating a state where a label wound around a dummy core mold is offset.

The label L can precisely be positioned without any offset in the following manner. The label 1, wound around the dummy core mold 5 is liable to be offset as shown in FIG. 11, and the following method can effectively prevent the offset of the label L.

Immediately before the dummy core mold 5 retaining the label L fixed thereon is matched with the cavity mold 6, the suction from the dummy core mold 5 is stopped and, at the same time, the evacuated air chamber 53 is preferably brought back to the atmospheric pressure through the atmospheric release valve 56. Thus, the positional offset of the label L can be corrected for locating the label L in a predetermined position by matching the dummy core mold 5 with the cavity mold 6 while stopping the suction of the label L from the dummy core mold 5.

More specifically, where a construction is employed in which the dummy core mold 5 is located below the cavity mold 6 and the dummy core mold 5 located on the lower side is adapted to be moved up, the label L is freed by stopping the suction from the dummy core mold 5 and preferably bringing the air chamber 53 instantaneously back to the atmospheric pressure through the atmospheric release valve 56 immediately before the mold matching. At this time, the label L naturally moves down by gravity, and is supported on a flange 59 formed along a lower circumferential edge of the dummy core mold 5 for the positioning thereof. The upper edge of the label L abuts against the top inner wall of the cavity mold 6. Thus, the positional offset of the label L can be corrected.

Where a mold assembly is employed which is designed such that the dummy core mold 5 is located above the cavity mold 6 and the dummy core mold 5 is moved down, the suction from the dummy core mold 5 is stopped immediately before the mold matching to correct the positional offset of the label L by utilizing the innermost face of the cavity of the cavity mold 6.

With the offset of the label L thus corrected, the dummy core mold 5 is inserted into the cavity mold 6, and then the air chamber 53 is pressurized. Thus, the label L is pressed against the inner wall of the cavity mold 6 by air jet through the vent holes 52. Thus, the label L is released from the dummy core mold 5, transferred onto the cavity inner wall of the cavity mold 6 and fixed thereon in intimate contact therewith.

The molding of the foamed resin container with a label can be achieved in the same manner as in the aforesaid embodiment. In this embodiment, the label L can be positioned more precisely.

Thereafter, the dummy core mold 5 is withdrawn from the cavity mold 6 with the label L fixed on the cavity inner wall in intimate contact therewith, and the core mold 7 is locked with the cavity mold 6. The mold locking is achieved, for example, with the use of a press for beads foam molding. The press includes a platform 60 provided on the upper side and a movable platform 70 provided on the lower side and adapted to be moved up and down by a ram 75. The cavity mold 6 is fixed to the platform 60, while the core mold 7 is fixed to the movable platform 70. By locking the cavity mold 6 with the core mold 7, a cavity 8 is defined therebetween which has a configuration compatible with the container to be produced.

The core mold 7 has a steam chamber 71 provided therein, a steam and cooling water feeding port 72, a drain 73 and an air vent (not shown). The core mold 7 further includes, though not shown, pressure reduction valves (regulators) and electromagnetic valves including a load air valve, a steam valve, a direct heating valve for the cavity 8, a drain valve, a cooling water valve and an air outlet valve, and control panel for controlling these valves.

The material for the foamed resin container shown in FIG. 13 is, for example, polystyrene beads containing a blowing agent and having a diameter of 0.25 mm. The polystyrene beads are preformed twelve times in bulkiness (to a diameter of 0.57 mm). The foamed resin container is produced from the prefoamed resin beads with a foaming ratio of 12 by an in-mold bead foam molding. The foamed resin container has a configuration, as shown in FIG. 13, with a top diameter of 96 mm, a bottom diameter of 68 mm, a height of 107 mm and a side wall thickness of 2 mm.

The foamable thermoplastic resin to be used as the material for the foamed resin container is not particularly limited as long as the resin can contain a blowing agent and is suitable for the in-mold bead foam molding. Examples thereof include polystyrene resins such as polystyrene, high-impact polystyrene, styrene-maleic anhydride copolymer and styrene-acrylonitrile copolymer, polyolefin resins such as polyethylene, polypropylene and ethylene-vinyl acetate copolymer, and mixtures thereof.

The molding of the foamed resin container with a label is achieved in the following manner. Vacuum valves of the cavity mold 6 are opened to evacuate the gaps defined between the label L and the suction grooves 66 through the vent holes 65, and then the dummy core mold 5 is withdrawn from the cavity mold with the label L fixed onto the inner wall of the cavity mold 6 in intimate contact therewith. The cavity mold 6 is matched and locked with the core mold 7. Then, the load air valve is opened to load the prefoamed bead; into the cavity 8. Thereafter, steam is introduced into the steam chamber 62 of the cavity mold 6 and the steam chamber 71 of the core mold 7 for heating thereof. At this time, the drain valve is opened to drain condensed.

In turn, the direct heating valve is opened for direct heating of the cavity 8. When the prefoamed beads are fuse-bonded with each other, the cooling water valve is opened to cool the entire mold. After the cooling, the air outlet valve is opened for disloading of air, and the foamed resin container C with a label is transferred onto the core mold 7. Then, the movable platform 70 is lowered by the ram 75 to open the mold, and the foamed resin container C with a label is taken out.

In this embodiment, the label L comprises a 30-$\mu$m thick polypropylene film bearing a printing on its rear surface and a 30-$\mu$m thick adhesive layer of a vinyl acetate-ethylene copolymer formed on the rear print surface of the polypropylene film, and has a total thickness of 60 $\mu$m.

In accordance with the present invention, the foamed resin container with a label can efficiently be molded in an integral manner with a smaller number of process steps, and the label L is prevented from being offset with respect to the container and from being readily peeled off. In addition, the container can readily be produced which is provided with a label L bearing information represented by fine letters and a sharp design such as including smooth gradation printed thereon by multi-color printing or the like. The label L thus provided is aesthetic without any bubble trapped between the label L and the foamed resin container and any wrinkle. The configuration of the foamed resin container with a label is not limited to the one shown in the drawings, but the present invention is applicable to foamed resin containers having any of various configurations.

Where the label L to be used bears a printing on its adhesive surface to be brought in contact with the foamed resin container, ink applied on its print layer is not transferred onto the cavity mold 6 by application of heat, so that the printing failure due to the transfer can be prevented. In such a case, the label L comprises a transparent resin sheet, a print layer and, as required, an adhesive layer. Since a resin is used instead of paper as the material for the label L, the label L is less liable to absorb moisture when the molding of the foamed resin container employs steam heating.

Where the label L is formed of a material having an excellent gas barrier property and applied on the entire circumferential surface of the foamed resin container by integral molding, the foamed resin container provides for excellent moisture-proof and gas-barrier effects, so that the container can be used as a food container suitable for long-term storage.

The label L may be provided not entirely but partially on the circumferential surface of the container. For example, the label L may be configured such that smaller the length thereof is smaller than the height of the trunk of the mold product. Where the label L is provided to cover only the middle portion of the trunk of the mold product, swelling of the trunk of the mold product can be prevented which may result from moisture absorption by a content such as noodles contained in the mold product. Where the label L is provided to cover only the upper portion of the trunk of the mold product, the top of the mold product can be reinforced. Thus, a less expensive mold product can be obtained.

As previously described, the present invention provides a process and apparatus for producing a foamed resin container with a label, which employs a thin and less stiff resin sheet instead of a paper base, and is adapted to stamp a label body printed on the sheet and apply the label body as the label in a predetermined position on the foamed resin container by integral molding without preliminarily rolling the label into a tubular shape. Therefore, ready and continuous production of foamed resin containers with labels can be achieved by following a process sequence including the steps of supplying a sheet which bears label bodies printed in predetermined positions thereon, positioning a label body, punching the label body, and molding a container with the label properly positioned.

In accordance with the present invention, a continuous sheet which bears label bodies printed in predetermined positions thereon is supplied, then label bodies are cut off and fixed on the label reception platform to that position, and the label reception platform and the dummy core molds are transported to predetermined positions. Accordingly, only one positioning operation is required before the label punching, and no subsequent positioning operation is required. Therefore, the foamed resin container with a label provided in a predetermined position on the circumferential surface thereof in an integral manner can be produced readily and efficiently. Further, the step of rolling the label to be applied on the container into a tubular shape can be eliminated, so that the apparatus can be simplified, requiring no complicated process and no special device.

The process for correcting possible positional offset of the label includes the steps of stopping the suction from the dummy core mold immediately before the dummy core mold holding the label thereon is matched with the cavity mold, and matching the dummy core mold with the cavity mold. In this process, even if the positional offset of the label occurs when the label is wound around the dummy core mold, the label is temporarily freed and the positional offset of the label is corrected during the mold matching operation. In the subsequent step, the label is transferred onto the inner wall of the cavity mold and fixed thereon in intimate contact therewith by pressurizing the label through the vent holes of the dummy core mold. Thus, the label can be applied precisely in a predetermined position on the cavity mold.

The resulting foamed resin container is free from wrinkles and bubbles trapped between the label and the foamed resin container. Further, the foamed resin container is aesthetic, and the label is flush with the circumferential surface of the foamed resin container, and is less liable to be peeled off. Therefore, the foamed resin container can readily be produced which has a label bearing information represented by fine letters and a sharp design such as including smooth gradation printed thereon by multi-color printing or the like.

We claim:

1. A process for producing a foamed resin container with a label provided on a circumferential surface thereof by integral molding, comprising steps of:

supplying a continuous sheet which bears label bodies printed thereon to a label punching device upon positioning each of the label bodies at a punching position;

cutting off the label body and then fixing the resulting label on a label reception platform having means for fixing the label beneath the punching position;

moving the label reception platform bearing the label fixed thereon to supply the label to a predetermined position with respect to a dummy core mold;

applying pressurized gas jet to the label to wind the label around the dummy core mold, and fixing the label around the dummy core mold by suction through vent holes formed in the dummy core mold;

matching the dummy core mold bearing the label fixed thereon with a cavity mold, and then transferring and fixing the label onto an inner wall of the cavity mold in intimate contact therewith by stopping the suction from the dummy core mold or by pressurizing through the vent holes of the dummy core mold while sucking through vent holes formed in the cavity mold;

separating the dummy core mold from the cavity mold which bears the label fixed on the cavity inner wall in intimate contact therewith; and locking the cavity mold with a core mold, loading foamable resin beads therebetween, and heating the foamable resin beads for foam molding, whereby the foamed resin container is molded integrally with the label.

2. An apparatus for producing a foamed resin container with a label provided on a circumferential surface thereof by automatically performing a process sequence from a label punching step to an integral molding step, comprising:

a sheet feeding device having a mechanism which is capable of positioning each of label bodies printed on a continuous sheet;

a label punching device which includes a punching mechanism for punching the supplied sheet in order to obtain a label in a predetermined configuration, and a label reception platform adapted to fix the label thereon at a position where the label has been punched and to be movable to a predetermined position with respect to a dummy core mold;

a device for winding up the sheet after the punching of the label;

a cavity mold provided in association with the dummy core mold so that the cavity mold can be matched with the dummy core mold, the dummy core mold having vent holes for suction to fix the label around the dummy core mold after the label is wound around the dummy core mold by a pressurized gas jet mechanism; and a core mold provided in association with the cavity mold so that the cavity mold can be matched with the core mold, the cavity mold having suction holes for intimately fixing the label thereon by sucking the label after the label is transferred from the dummy core mold onto an inner wall of the cavity mold, a feed hole for feeding foamable resin beads and heater means for foam molding, the cavity mold having heater means for the foam molding.

3. An apparatus for producing a foamed resin container with a label as set forth in claim 2, wherein the label punching mechanism includes a punching plate for cutting off the label from the sheet which bears the label bodies printed thereon and then holding the label, the punching plate being formed with an opening having a configuration compatible with the label, and the label reception platform is adapted to move up through the opening to the upper side of the punching plate and have vent holes for pressurization and suction.

4. A process for producing a foamed resin container with a synthetic resin label provided on a circumferential surface thereof by integral molding, comprising steps of:

winding the label around a dummy core mold, and retaining the label around the dummy core mold by suction through vent holes formed in the dummy core mold;

correcting a possible positional offset of the label by stopping the suction from the dummy core mold immediately before the dummy core mold retaining the label is matched with a cavity mold, or by matching the dummy core mold with the cavity mold;

transferring the label onto an inner wall of the cavity mold and fixing the label thereon in intimate contact therewith by pressurizing the label through the vent holes of the dummy core mold;

separating the dummy core mold from the cavity mold with the label fixed onto the cavity inner wall in intimate contact therewith; and locking the cavity mold with a core mold with the label fixed onto the cavity inner wall in intimate contact therewith, then loading foamable resin beads, and heating the foamable resin beads for foam molding, whereby the foamed resin container is molded integrally with the label.

* * * * *